US008973762B2

(12) United States Patent
Sellars et al.

(10) Patent No.: US 8,973,762 B2
(45) Date of Patent: *Mar. 10, 2015

(54) INDUSTRIAL ABSORBENTS AND METHODS OF MANUFACTURING THE SAME

(71) Applicant: Sellars Absorbent Materials, Inc., Milwaukee, WI (US)

(72) Inventors: William R. Sellars, Milwaukee, WI (US); John C. Sellars, Wauwatosa, WI (US); Thomas C. Shutt, Milwaukee, WI (US)

(73) Assignee: Sellars Absorbent Materials, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,846

(22) Filed: Nov. 16, 2012

(65) Prior Publication Data

US 2013/0072380 A1  Mar. 21, 2013

Related U.S. Application Data

(63) Continuation of application No. 11/538,746, filed on Oct. 4, 2006, now Pat. No. 8,318,062.

(51) Int. Cl.
*B32B 27/06* (2006.01)
*B32B 5/02* (2006.01)
(Continued)

(52) U.S. Cl.
CPC .............. *B32B 27/06* (2013.01); *B01J 20/24* (2013.01); *B01J 20/28023* (2013.01);
(Continued)

(58) Field of Classification Search
CPC ........ B32B 27/06; B32B 5/022; B32B 5/028; B32B 5/26; B01J 20/24; B01J 20/28023; B01J 20/28026; B01J 20/28033; B01J 20/28035; B01J 2220/4825

USPC .............. 210/503, 504, 505, 506, 507, 508; 428/300.4, 300.7, 301.4; 264/112, 121, 264/122, 123, 128; 156/60, 62.4, 272.4, 156/305, 306.3; 427/446, 244, 121, 180, 427/202; 181/284, 286; 442/416
See application file for complete search history.

(56) References Cited

U.S. PATENT DOCUMENTS 3,047,444 A    7/1962    Harwood
3,232,821 A    2/1966    Moore et al.
(Continued)

FOREIGN PATENT DOCUMENTS

WO    90/04455    5/1990
WO    97/37757    10/1997

OTHER PUBLICATIONS

PCT/US2007/079896 International Search Report and Written Opinion, 12 pages, dated Apr. 2, 2008.
(Continued)

*Primary Examiner* — John Kim
(74) *Attorney, Agent, or Firm* — Michael Best & Friedrich LLP

(57) ABSTRACT

An industrial absorbent and methods of manufacturing the same. In one embodiment, the industrial absorbent includes a first scrim made from at least one thermoplastic material; a second scrim made from at least one thermoplastic material; and a middle layer positioned between the first and second scrims. The middle layer includes a dry-laid web of fire-retardant treated cellulose and opened, individuated staple bicomponent fiber. At least some of the bicomponent fiber in the middle layer is thermally bonded to at least some of the cellulose in the middle layer, and the first and second scrims are thermally bonded to the middle layer.

12 Claims, 4 Drawing Sheets

(51) Int. Cl.
  *B32B 5/26*     (2006.01)
  *B01D 39/18*    (2006.01)
  *B01J 20/24*    (2006.01)
  *B01J 20/28*    (2006.01)

(52) U.S. Cl.
  CPC ..... *B01J 20/28026* (2013.01); *B01J 20/28033* (2013.01); *B01J 20/28035* (2013.01); *B32B 5/022* (2013.01); *B32B 5/028* (2013.01); *B32B 5/26* (2013.01); *B01J 2220/4825* (2013.01)
  USPC .......... 210/504; 210/503; 210/505; 210/506; 210/508; 428/300.4; 428/300.7; 428/301.4; 442/416

(56) References Cited

U.S. PATENT DOCUMENTS

| | | | |
|---|---|---|---|
| 3,860,002 A | 1/1975 | Kolbach | |
| 4,000,237 A | 12/1976 | Roberts, Jr. | |
| 4,033,881 A | 7/1977 | Pall | |
| 4,064,599 A | 12/1977 | Neuenschwander | |
| 4,112,192 A | 9/1978 | Vreeland | |
| 4,134,948 A | 1/1979 | Baker, Jr. | |
| 4,135,024 A | 1/1979 | Callahan et al. | |
| 4,160,059 A | 7/1979 | Samejima | |
| 4,168,175 A | 9/1979 | Shutt | |
| 4,442,095 A | 4/1984 | Johnston | |
| 4,458,042 A | 7/1984 | Espy | |
| 4,468,336 A | 8/1984 | Smith | |
| 4,587,154 A | 5/1986 | Hotchkiss et al. | |
| 4,590,114 A | 5/1986 | Holtman | |
| 4,595,414 A | 6/1986 | Shutt | |
| 4,600,462 A | 7/1986 | Watt | |
| 4,678,822 A | 7/1987 | Lewellin | |
| 4,780,518 A | 10/1988 | Ceaser | |
| 4,804,695 A | 2/1989 | Horton | |
| 4,822,668 A | 4/1989 | Tanaka et al. | |
| 4,837,067 A | 6/1989 | Carey, Jr. et al. | |
| 4,879,170 A | 11/1989 | Radwanski et al. | |
| 4,929,495 A | 5/1990 | Stanislawczyk | |
| 5,023,131 A | 6/1991 | Kwok | |
| 5,057,168 A | 10/1991 | Muncrief | |
| 5,064,689 A | 11/1991 | Young, Sr. et al. | |
| 5,071,511 A | 12/1991 | Pittman | |
| 5,082,563 A | 1/1992 | Webb et al. | |
| 5,134,179 A | 7/1992 | Felegi, Jr. et al. | |
| 5,167,765 A | 12/1992 | Nielsen et al. | |
| 5,225,242 A | 7/1993 | Frankosky et al. | |
| 5,264,192 A | 11/1993 | Shutt et al. | |
| 5,275,875 A | 1/1994 | Suh et al. | |
| 2,358,607 A | 10/1994 | Ellis | |
| 5,358,607 A * | 10/1994 | Ellis | 162/100 |
| 5,393,599 A | 2/1995 | Quantrille et al. | |
| 5,491,186 A | 2/1996 | Kean et al. | |
| 5,516,580 A | 5/1996 | Frenette et al. | |
| 5,531,890 A | 7/1996 | Keenan | |
| 5,534,301 A | 7/1996 | Shutt | |
| 5,609,667 A | 3/1997 | Dickerson | |
| 5,683,810 A | 11/1997 | Babbitt et al. | |
| 5,786,059 A | 7/1998 | Frank et al. | |
| 5,834,385 A | 11/1998 | Blaney et al. | |
| 5,837,626 A | 11/1998 | McCullough | |
| 5,910,367 A | 6/1999 | Kean et al. | |
| 5,972,039 A | 10/1999 | Honeycutt et al. | |
| 5,981,410 A | 11/1999 | Hansen et al. | |
| 5,993,501 A | 11/1999 | Cusick et al. | |
| 6,025,027 A | 2/2000 | Shutt | |
| 6,109,389 A | 8/2000 | Hiers et al. | |
| 6,139,941 A | 10/2000 | Jankevics et al. | |
| 6,159,882 A | 12/2000 | Kean et al. | |
| 6,171,684 B1 | 1/2001 | Kahlbaugh et al. | |
| 6,177,607 B1 | 1/2001 | Blaney et al. | |
| 6,296,076 B1 | 10/2001 | Hiers et al. | |
| 6,296,737 B1 | 10/2001 | Wu et al. | |
| 6,305,920 B1 | 10/2001 | Kean et al. | |
| 6,475,315 B1 | 11/2002 | Kean et al. | |
| 6,573,204 B1 | 6/2003 | Philipp et al. | |
| 6,583,331 B1 | 6/2003 | McCormack et al. | |
| 6,589,643 B2 | 7/2003 | Okada et al. | |
| 6,635,136 B2 | 10/2003 | White et al. | |
| 6,759,356 B1 | 7/2004 | Myers | |
| 6,784,126 B2 | 8/2004 | Everhart et al. | |
| 6,811,588 B2 | 11/2004 | Niakin | |
| 6,867,154 B1 | 3/2005 | Lunsford et al. | |
| 6,867,156 B1 | 3/2005 | White et al. | |
| 6,872,431 B2 | 3/2005 | Kahlbaugh et al. | |
| 6,986,842 B2 | 1/2006 | Bortnik et al. | |
| 6,989,193 B2 | 1/2006 | Haile et al. | |
| 6,998,164 B2 | 2/2006 | Neely et al. | |
| 7,033,497 B1 | 4/2006 | Yamaguchi et al. | |
| 7,094,270 B2 | 8/2006 | Schultink et al. | |
| RE39,260 E | 9/2006 | Byrd et al. | |
| 7,115,150 B2 | 10/2006 | Johnson et al. | |
| 7,156,953 B2 | 1/2007 | Tirimacco et al. | |
| 7,189,666 B2 | 3/2007 | Finnegan et al. | |
| 7,195,810 B1 | 3/2007 | Schmidt et al. | |
| 7,279,059 B2 | 10/2007 | Haque | |
| 7,799,968 B2 | 9/2010 | Chen et al. | |
| 7,837,009 B2 * | 11/2010 | Gross et al. | 181/290 |
| 7,878,301 B2 | 2/2011 | Gross et al. | |
| 8,118,177 B2 * | 2/2012 | Drapela et al. | 210/504 |
| 2002/0028401 A1 | 3/2002 | Macholdt et al. | |
| 2003/0070262 A1 | 4/2003 | Andersen | |
| 2004/0097157 A1 | 5/2004 | Cosentino | |
| 2004/0122396 A1 | 6/2004 | Maldonado et al. | |
| 2005/0227566 A1 | 10/2005 | Bergquist et al. | |
| 2005/0281999 A1 * | 12/2005 | Hofmann et al. | 428/304.4 |
| 2006/0141884 A1 * | 6/2006 | Haque | 442/361 |
| 2007/0124894 A1 | 6/2007 | Drapela et al. | |
| 2007/0202771 A1 | 8/2007 | Douglass et al. | |
| 2007/0295659 A1 | 12/2007 | Rygalski et al. | |
| 2008/0121461 A1 | 5/2008 | Gross et al. | |
| 2008/0233381 A1 | 9/2008 | Sellars et al. | |
| 2008/0254699 A1 | 10/2008 | Mio et al. | |
| 2010/0197183 A1 | 8/2010 | Drapela et al. | |

OTHER PUBLICATIONS

PCT/US2007/079908 International Search Report and Written Opinion, 12 pages, dated Mar. 17, 2008.

Office Action from German Patent Application No. 04410041 dated Mar. 25, 2011 (English Translation and Original, 4 pages).

Office Action from Great Britain Patent Application No. 2455474 dated Nov. 16, 2010 (2 pages).

* cited by examiner

INDUSTRIAL ABSORBENTS AND METHODS OF MANUFACTURING THE SAME

RELATED APPLICATIONS

The present application is a continuation of U.S. patent application Ser. No. 11/538,746, filed Oct. 4, 2006.

BACKGROUND

Embodiments of the invention relate to non-woven materials and, more particularly, to certain types of non-woven materials which are known as industrial absorbents.

Industrial absorbents are used in a variety of circumstances. For example, non-woven absorbent pads are often used in manufacturing facilities to absorb water, oil, chemicals, and other liquids that may be dispensed, emitted, or leaked from various machines and manufacturing lines. For example, industrial absorbent pads may be used around cutting machines to absorb lubricants, printing presses to absorb ink, and processing equipment to absorb chemicals. The pads are used to help reduce the spread of such liquids into walkways, onto other machinery, to pick up spills after they occur, and similar purposes.

SUMMARY

Although current industrial absorbents are functional, industrial absorbents with improved characteristics such as increased absorbency, lower cost, and fire retardancy would be beneficial. Absorbency is often dependent on the bulk-to-weight ratio (or density) of the material. One embodiment of the invention includes an industrial absorbent made mostly from cellulose. The cellulose is processed in such a manner as to increase its bulk or volume, thereby helping to increase absorbency. In some embodiments, the finished industrial absorbent has an absorbency of about 1 to about 2.5 times its own weight and a bulk-to-weight ratio of about 10 to about 30. Another benefit of using cellulose is decreased costs. Most current industrial absorbents are made largely from polypropylene, a petroleum-derived material. Currently, it appears that the costs of petroleum-based products will continue to rise. Thus, reducing the amount of petroleum-based components in the absorbents can help to control costs. In addition, petroleum is considered to be a non-renewable resource. Thus, reducing the amount of petroleum-based components helps reduce dependency on non-renewable resources.

In many instances, cellulose is considered to pose higher fire risks than certain synthetic materials currently used in industrial absorbents. However, the cellulose used in certain embodiments of the invention is treated with a fire retardant to ensure that the end product has a fire retardancy that is equivalent to or better than current industrial absorbents.

Another benefit of certain embodiments of the invention is that scrap cellulose may be used. In many instances, scrap cellulose is available at relatively low cost. Thus, the overall cost of the end product is reduced. In addition, the use or recycling of scrap material may have environmental benefits.

In one embodiment the invention provides an industrial absorbent. The absorbent includes a top scrim made from at least one thermoplastic material, a bottom scrim made from at least one thermoplastic material, and a middle layer positioned between the top and bottom scrims. The middle layer includes a dry-laid web of fire-retardant treated cellulose and opened, individuated, staple bicomponent fiber. At least some of the bicomponent fiber in the middle layer is thermally bonded to at least some of the cellulose in the middle layer. In addition, the first and second scrims are thermally bonded to the middle layer.

Another embodiment of the invention provides a method of manufacturing an industrial absorbent. The method includes obtaining at least one type of cellulose from a group of cellulose sources including a source of virgin cellulose, a source of post-industrial cellulose, and a source of post-consumer cellulose, shredding the cellulose, and declumping and sizing the cellulose. The cellulose is metered into a spray booth where at least one additive is applied to the cellulose. The at least one additive can be selected from the group of a debonder, a colorant, fixant, and a fire retardant. The method also includes drying the cellulose; declumping and sizing the cellulose, fiberizing the cellulose, or both; metering the cellulose into a forming head; metering bicomponent fiber into the forming head; and forming a non-woven web of the cellulose and bicomponent fiber on a forming wire positioned below the forming head. The web is sandwiched between a first scrim and a second scrim to form a non-woven web. The non-woven web is then heated in an oven to cause an outer layer of the bicomponent fiber to melt. The molten material contacts other fiber and when re-hardened or cooled creates bonds between at least some of the bicomponent fiber and the cellulose. The heating process also causes at least a portion of the first and second scrims to bond with the non-woven web. After the non-woven web has been formed and cooled, it is then wound onto a parent roll in a continuous process. These rolls are then taken to a converting process where they are either cut into pads or converted into smaller rolls. It is also possible to replace the parent roll winder with an in-line sheeter to cut the non-woven web into pads as part of a continuous process.

Other aspects and embodiments of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
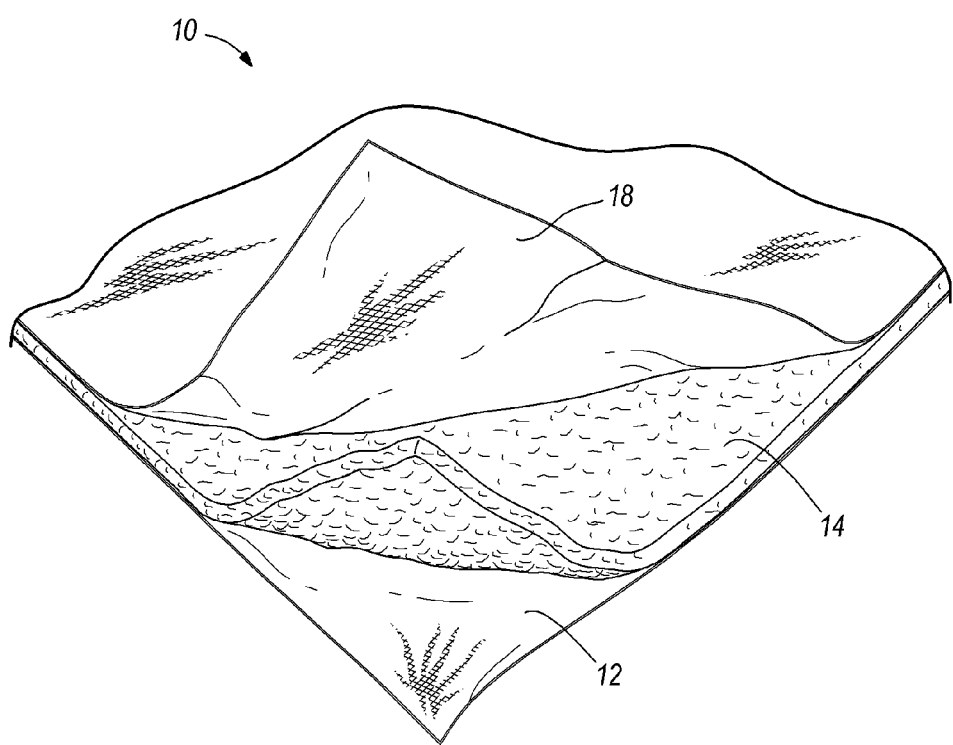
FIG. 1 is a perspective, partially exploded view of an industrial absorbent.

FIG. 1 illustrates an industrial absorbent pad 10 having a first, non-woven scrim 12, which may be made from one or more thermo-plastic materials such as polyethylene, polypropylene, and polyester. In one embodiment, the scrim 12 is made from spunbond, bicomponent material or fibers. In one common form, bicomponent fibers include an inner core of polypropylene and a sheath or outer layer of polyethylene. The outer sheath of polyethylene has a lower melting point than the core of polypropylene. As will be discussed in greater detail below, the scrim 12 is used as an outer layer for the pad 10 to help increase the tensile strength of the pad 10 and to protect a middle layer 14 of dry-laid material. One way in which the scrim helps protect the middle layer 14 is by preventing or reducing linting of the middle layer.

In one embodiment, the scrim 12 is fixed to the middle layer 14 by thermal bonds. In this instance, the scrim 12 is heated such that the polyethylene in the bicomponent fibers melts and comes into contact with fibers from the middle layer 14. The pad 10 is then cooled (or allowed to cool) so that the polyethylene re-hardens or cools to form bonding points between at least some of the bicomponent fibers in the scrim 12 and the fibers within the middle layer 14.

The middle layer 14 is, in at least one embodiment, comprised of cellulose or cellulose fibers and staple bicomponent fibers. In a preferred embodiment, the middle layer 14 includes about 90% cellulose and about 10% staple bicomponent fibers by weight. The cellulose can be obtained from a number of different sources including virgin cellulose, post-industrial cellulose (for example, scrap from a paper making facility), and post-consumer cellulose (for example, paper and similar materials recycled by individuals).

The pad 10 also includes a second, non-woven scrim 18. The second scrim 18 may be identical to the first scrim 12 and serves a similar purpose as the scrim 12. The second scrim 18 is fixed to the middle layer 14 in a manner similar to how the first scrim 12 is fixed to the middle layer.

Figure 2:
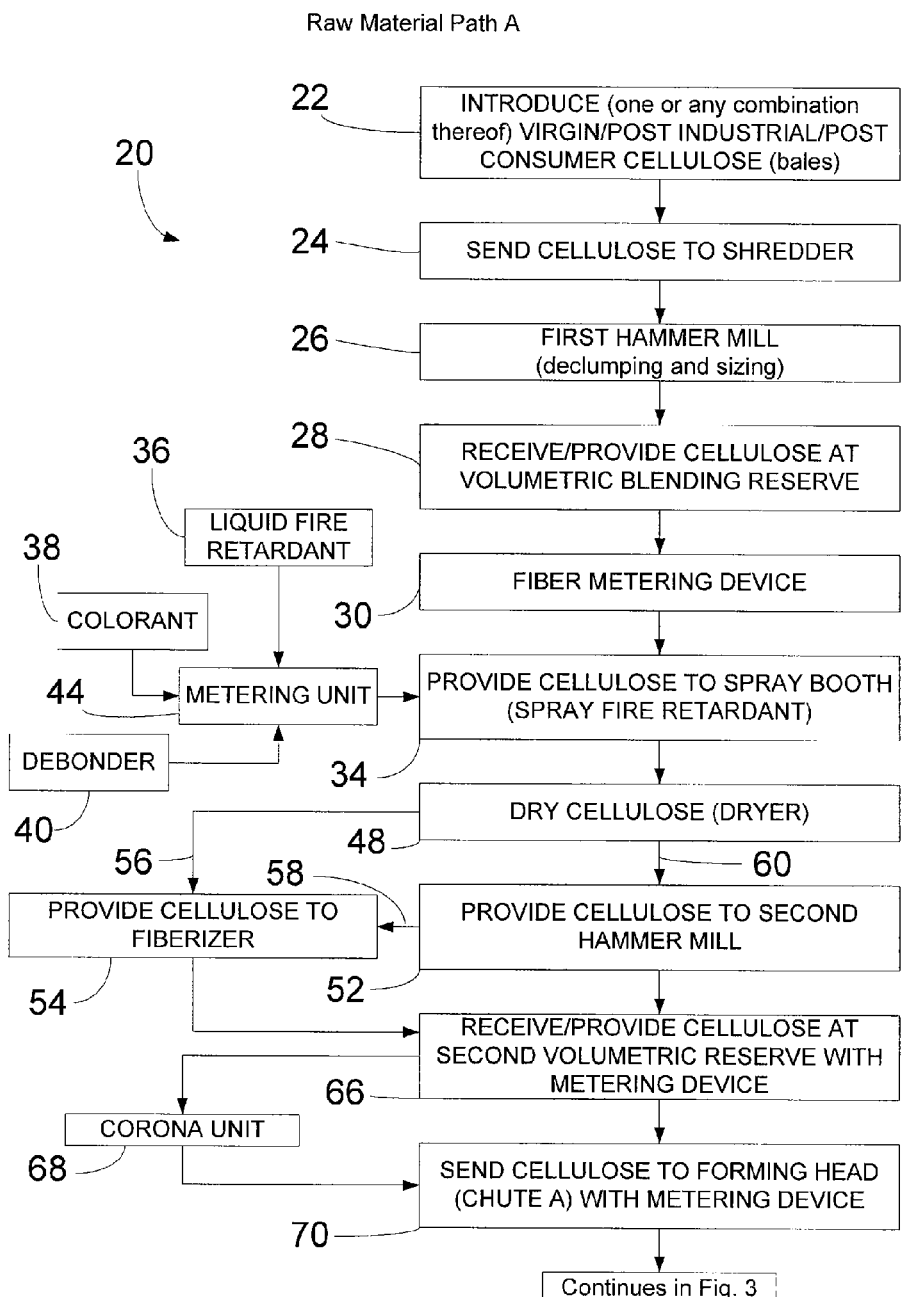
FIG. 2 is a flow chart illustrating a portion of a process for making an industrial absorbent.
Figure 3:
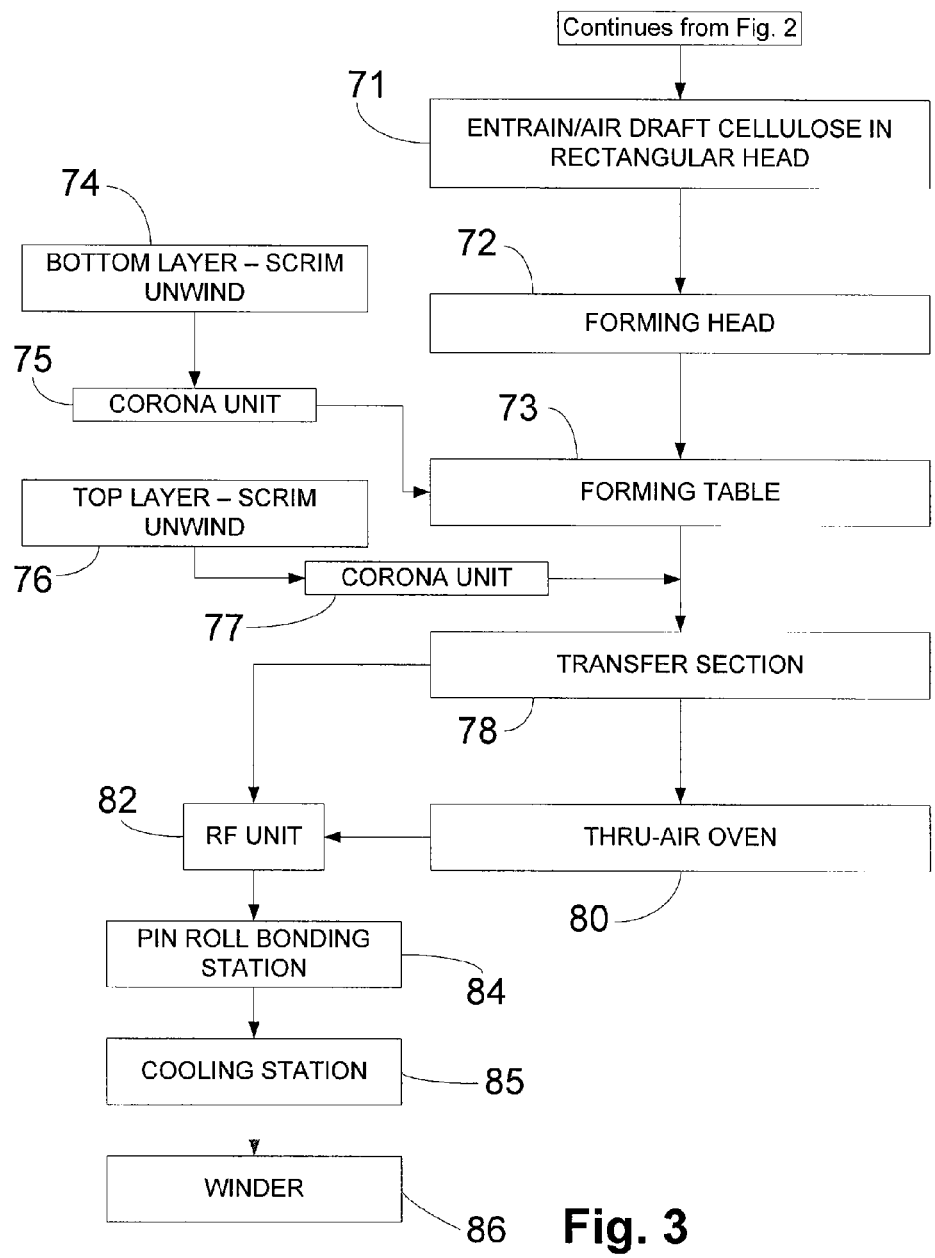
FIG. 3 is a flow chart illustrating another portion of a process for making an industrial absorbent.

FIG. 2 illustrates a process 20 for making the pad 10. The process 20 begins at step or block 22 in which cellulose from a variety of sources, including those described above, is obtained. Prior to being formed (along with bicomponent fiber) into the middle layer 14, the cellulose undergoes a number of processing steps. First, the cellulose is processed (i.e., shredded) in a shredder (block 24) and then declumped and sized in a first hammer mill (block 26). The processed cellulose may then be delivered to a reserve (block 28) to help ensure proper operation of downstream processes. In particular, a reserve may be used to help ensure that material is supplied to downstream processes at a constant or controlled rate.

The cellulose is then provided to a metering device (block 30) to help ensure the delivery of proper amounts of cellulose to downstream processes. In the embodiment shown, the cellulose is metered into a spray booth or similar device (block 34) (generically, an inline treatment process). A variety of liquid and dry additives may be added to the cellulose in the spray booth (or other treatment device) including fire retardants 36, colorants 38, colorant fixants, and debonders 40. The debonder (which may sometimes be a surfactant) diminishes and inhibits the formation of hydrogen bonds, which increases bulk and absorbency of the end product.

The purpose of colorant fixants, for example, is to reduce running or bleeding of the colorant added to the cellulose. In the embodiment shown in FIG. 2, the additives are metered into the spray booth through a metering unit (block 44). One manner of applying fire retardant and additives to the cellulose that may be useful in embodiments of the present invention is described in U.S. Pat. No. 5,534,301, which is assigned to one of the inventors of the present application.

After being treated in the spray booth, the cellulose is dried in a dryer (block 48). The dried cellulose is then provided to a second hammer mill, a fiberizer, or both as shown by blocks 52 and 54 and directional paths 56, 58, and 60. The hammer mill is useful for breaking up the cellulose into small pieces and the fiberizer is useful for individuating the fibers to increase the bulk-to-weight ratio. Thus, one purpose of the post-drying process is to break up clumps of cellulose that may have been formed when the cellulose is in the spray booth. In addition, the post-drying process helps individuate the cellulose fibers before the cellulose is delivered to a forming head (discussed below).

After the cellulose is processed in the second hammer mill, the fiberizer, or both, the cellulose is provided to a forming head of a dry-laid or air-laid device. Before being sent to the forming head, the cellulose may be provided to a second volumetric reserve (block 66) to control the rate of delivery of material. In addition, the cellulose, the bicomponent fiber, or both may be passed through a corona unit, which acts to electrically charge the cellulose and bicomponent fibers, as applicable (block 68). Electrically charging the bicomponent and cellulose fiber can help in increasing tensile strength of the non-woven web, for example, causing the fibers to hold onto or be attracted to other materials. Once appropriately processed, the cellulose is provided via an air stream to a chute with a metering device on top of the forming head (block 70). The cellulose is then air drafted into a rectangular head of the forming head (block 71). As the cellulose travels through ducts to the chute and into the forming head, the individuated cellulose fibers may reform into clumps. The forming head breaks up these clumps of cellulose (block 72) and deposits the cellulose fibers on a wire or conveyor (often referred to as a forming table) (block 73). The first scrim 12 is unwound (block 74) so that it may be provided to the forming table in a manner such that an air-laid web is formed on top of the scrim 12. If desired, the first scrim 12 may be processed in a corona unit (block 75) before it reaches the forming table. Processing the scrim 12 in the corona unit helps to increase adhesion of the scrim 12 to the layer 14. As will be discussed later, the cellulose is mixed with bicomponent fiber in the forming head. Thus, the air-laid web (or middle layer 14) formed on the forming table includes a mixture of cellulose fibers (processed and treated as described above) and bicomponent fiber (processed as described below).

After the web is formed on the first scrim 12, the second scrim 18 is applied to the top of the web. In particular, the scrim 18 may be unwound (block 76), processed in a corona unit (block 77), and placed on top of the web formed on the forming table. Once the three layers of the pad 10 have been positioned correctly with respect to one another, the scrims 12 and 18 and the middle layer 14 can be bonded together. In addition, the cellulose material in the middle layer 14 may be bonded together. In one embodiment, the non-woven web 10 is passed through a transfer station (block 78) and subsequently through an oven, which can take the form of a conventional thermal oven or a radio frequency ("RF") or microwave oven (blocks 80 and 82). While in the oven, the bicomponent fibers in the scrims 12 and 18 and the bicomponent fibers in middle layer 14 melt. As a consequence, thermal bonds are formed between the scrims 12 and 18 and the middle layer 14 and within the middle layer 14. (The bonds are formed in a manner as was described above with respect to scrim 12). After being heated in the oven, the non-woven web 10 may be processed in a pin roll bonding station, if desired (block 84). A pin roll creates dimples in the non-woven web 10 and these dimples help to mechanically hold the layers of the non-woven web 10 together. The pin roll station may include one or more pin rolls.

Once the pad is bonded and optionally dimpled, it may be wound on a winder (block 86). Rolls of pad material may be converted in a separate process such that the pad material is cut to desired sizes and packaged in containers suitably designed to enable easy dispensing of individual pads by end users. Alternatively, the pad material may be wound on smaller rolls or cut, inline, into pads suitable for sale to end users.

Figure 4:
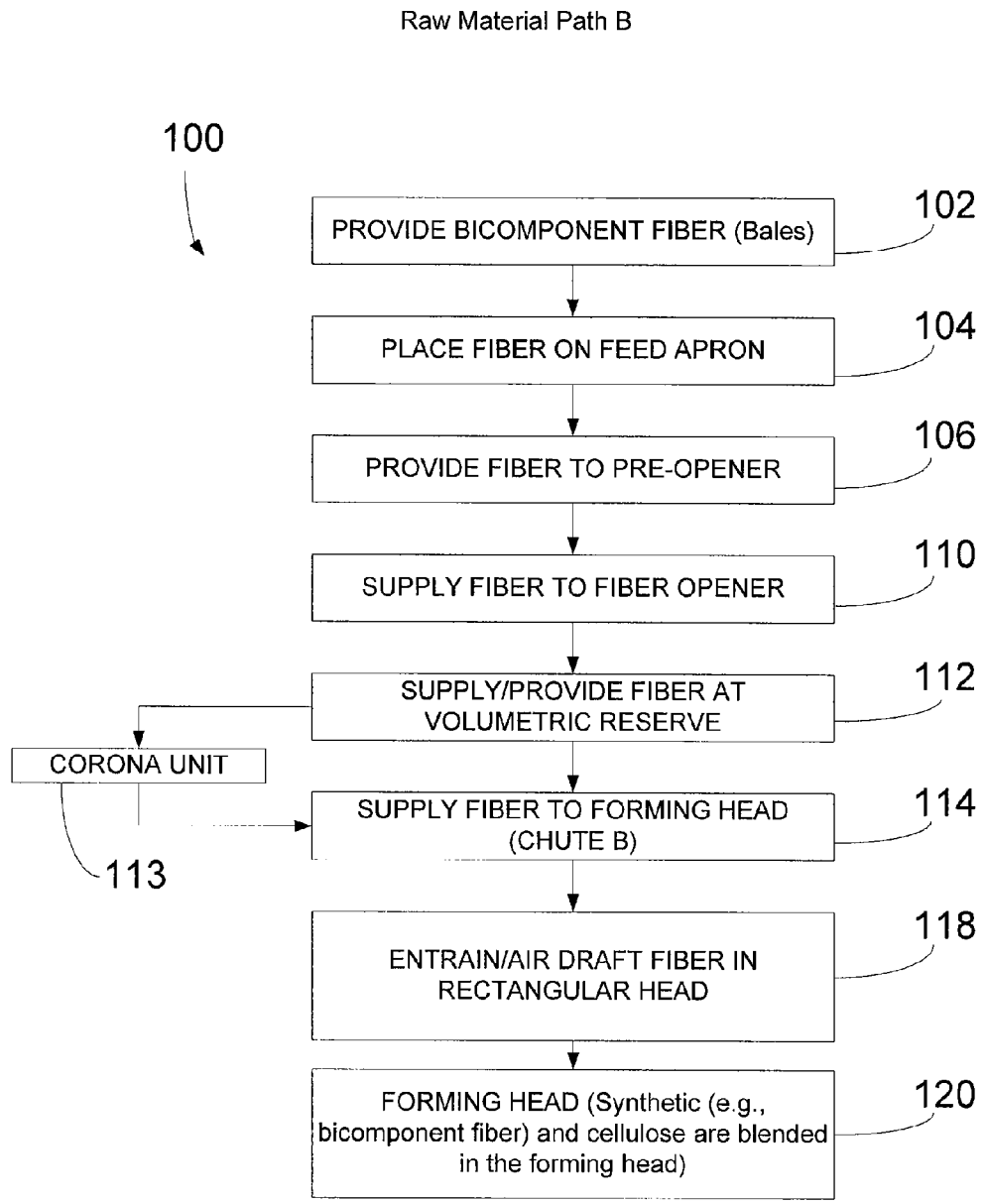
FIG. 4 is a flow chart illustrating another portion of a process for making an industrial absorbent.

As noted, bicomponent fiber is provided to the forming head. In one embodiment, the bicomponent fibers are staple bicomponent fibers. In certain embodiments fibers of about 1 to 10 denier (thickness) and lengths of about ⅛" to about 4" can be used. FIG. 4 illustrates a process 100 by which bicomponent fiber is processed and supplied to the forming head. First, bulk bicomponent fiber (usually in the form of bales) (block 102) is supplied to a feed apron (block 104). Prior to supplying the bales to the feed apron, the straps or wires holding the bales are removed. The feed apron moves the bales of bicomponent fiber to a pre-opener (block 106). The pre-opener breaks the bails into pieces and transfers metered amounts of bicomponent fibers to an opener (block 110). The opener breaks apart the pieces of bicomponent material so as to open and individuate the fibers. If desired the individuated fibers may be transferred to a volumetric reserve (block 112) to help control the rate of fiber delivery to downstream processes. In addition, the bicomponent fiber may also be passed through a corona unit (block 113). Fiber is transported via an air stream from the volumetric reserve to a chute above the forming head (block 114). High velocity ductwork entrains the fiber in an air stream, which carries the fiber into the forming head (block 118). The bicomponent fiber is mixed with the cellulose fibers in the forming head (block 120). As described above, an air- or dry-laid web of cellulose and bicomponent fibers is created by the forming head. A forming head suitable for use in making the pad 10 is described in U.S. patent application Ser. No. 11/296,125, which is owned by the same assignee of the present application.

If desired, the bicomponent fiber may be treated with a surfactant. When so treated, the bicomponent fiber becomes hydrophilic. The surfactant also helps to increase bulk and absorbency.

What has been described with respect to process 20 and process 100 involves the use of separate chutes to deliver fibers to a forming head: a first chute provides cellulose fibers to the forming head and a second chute provides bicomponent fibers to the forming head. In addition to the two-chute process, it is possible to use a single chute into which both cellulose and bicomponent fiber are placed. In addition, the chute or chutes do not need to be placed on top of the forming head. For example, fiber may be entrained in an air (generically, fluid) stream within a venturi type duct that leads into the forming head.

As should be apparent from the above, embodiments of the invention provide, among other things, industrial absorbents and methods of manufacturing the same. Various features, advantages, and embodiments of the invention are set forth in the following claims.

What is claimed is:

1. An industrial absorbent comprising:
   a non-woven web formed from a mixture containing shredded recycled cellulose treated with liquid fire retardant and binder fibers, wherein the liquid fire retardant is applied to shredded cellulose before the non-woven web is formed; and
   a first thermoplastic scrim thermally bonded to a surface of the non-woven web.

2. An industrial absorbent as claimed in claim 1, wherein at least some of the binder fibers in the non-woven web are thermally bonded to at least some of the cellulose in the non-woven web, and the first thermoplastic scrim is thermally bonded to at least some of the binder fibers.

3. An industrial absorbent as claimed in claim 1, wherein the binder fibers comprise bicomponent fibers.

4. An industrial absorbent as claimed in claim 1, wherein the cellulose includes cellulose treated with a debonder.

5. An industrial absorbent as claimed in claim 4, wherein the cellulose includes a colorant.

6. An industrial absorbent as claimed in claim 5, wherein the cellulose includes a colorant fixant.

7. An industrial absorbent as claimed in claim 1, wherein the first thermoplastic scrim includes spunbond, bicomponent material.

8. An industrial absorbent as claimed in claim 1, wherein the non-woven web includes a mixture of about 90% of cellulose and about 10% of bicomponent fiber, by weight.

9. An industrial absorbent as claimed in claim 1, wherein the non-woven web has a bulk-to-weight ratio of about 10 to about 30 mils/osy.

10. An industrial absorbent as claimed in claim 1 having an absorbency of about 1 to about 2.5 times its own weight.

11. An industrial absorbent as claimed in claim 1, wherein the cellulose includes waste cellulose.

12. An industrial absorbent as claimed in claim 1, further comprising a second thermoplastic scrim thermally bonded to a second surface of the non-woven web opposite to the first thermoplastic scrim.

* * * * *